A. DREW.
COMBINATION LOCK FOR STEERING COLUMNS.
APPLICATION FILED OCT. 12, 1917.
1,261,791.
Patented Apr. 9, 1918.
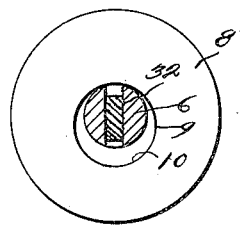
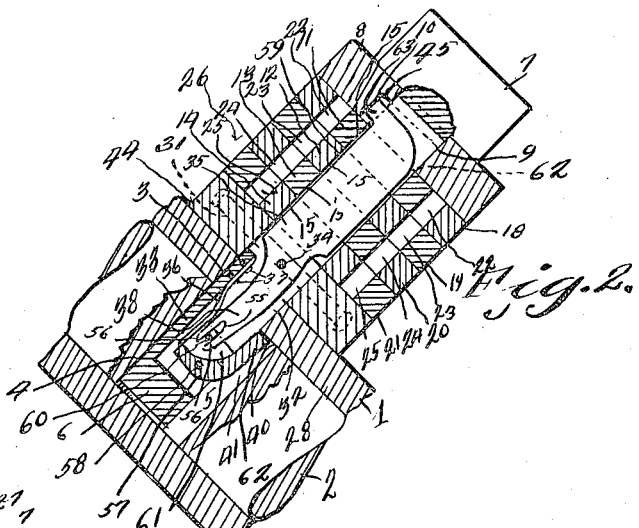
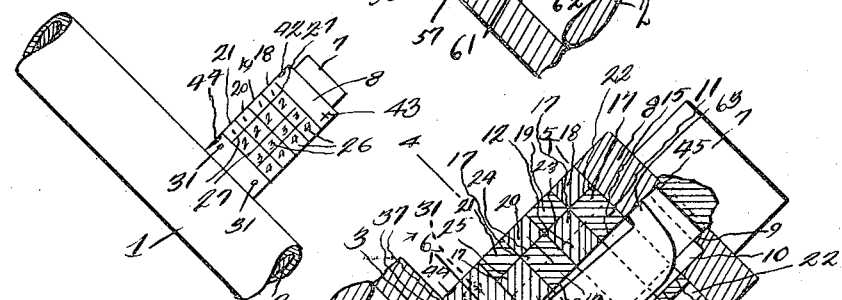
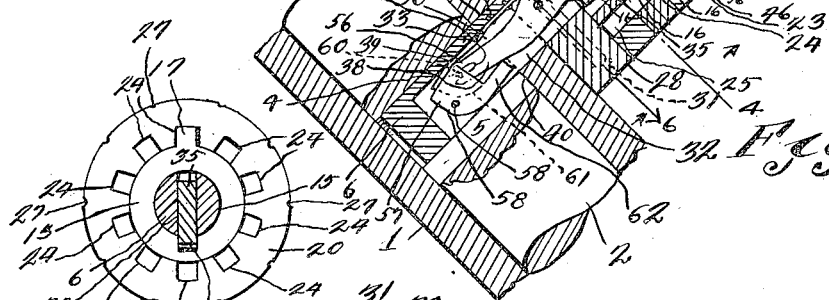
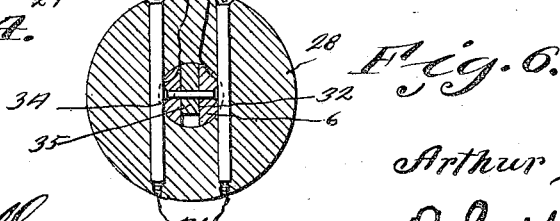
Inventor
Arthur Drew

UNITED STATES PATENT OFFICE.

ARTHUR DREW, OF PERRY, OKLAHOMA.

COMBINATION-LOCK FOR STEERING-COLUMNS.

1,261,791.

Specification of Letters Patent.

Patented Apr. 9, 1918.

Application filed October 12, 1917. Serial No. 196,143.

*To all whom it may concern:*

Be it known that I, ARTHUR DREW, a citizen of the United States, residing at Perry, in the county of Noble and State of Oklahoma, have invented a new and useful Combination-Lock for Steering-Columns; and I do hereby declare the following to be a full, clear, and exact description of the invention, such as will enable others skilled in the art to which it appertains to make and use the same.

This invention relates to an improved combination lock, and one of the objects of the invention is to provide an improved device of this kind, particularly adapted for use in connection with steering columns of automobiles, whereby the steering mechanism may be locked, consequently preventing unauthorized persons from being able to manipulate the steering mechanism, therefore preventing stealing of automobiles.

A further object of the invention is to provide an improved combination lock having means whereby the combination may be altered or varied.

A further object of the invention is the provision of a steering pole having a notched opening and adapted to receive the shank (which is in the form of a bolt) of the combination lock, there being a latch to engage the notch, to prevent turning of the steering pole, said combination lock having means to be manipulated, whereby certain numerals are alined, for unlocking the latch.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of a portion of a steering column, showing the improved combination lock as applied thereto.

Fig. 2 is a sectional view through the lock, and showing parts in elevation, illustrating the latch member locked.

Fig. 3 is a sectional view similar to Fig. 2, showing the latch member unlocked.

Fig. 4 is a sectional view on line 4—4 of Fig. 3.

Fig. 5 is a sectional view on line 5—5 of Fig. 3.

Fig. 6 is a sectional view on line 6—6 of Fig. 3.

Referring more especially to the drawings, 1 designates the usual hollow steering column, and 2 denotes the steering pole or rod mounted in said tubular column. The wall of the column 1 has an opening 3, and the steering pole or rod 2 has a transverse opening 4, which is provided with an elongated groove or keeper 5. The combination lock comprises a suitable carrying bolt for the members or parts of the lock. This carrying bolt comprises the shank 6 and its head 7. Mounted upon the shank 6 and disposed adjacent the head 7 is a disk 8. The central opening 9 of the disk 8 is provided with a cutaway portion 10, which is constructed eccentrically with relation to the opening 9. Also mounted upon the shank 6 of the bolt is a plurality of rings, holding means or members 11, 12, 13 and 14, each of which is rectangular in cross section. The opening 15 of each ring is provided with a notch 16, and the outer marginal edge thereof, diametrically opposite the notch 16, is provided with a radially extending lug or projection 17. Surrounding the rings 11, 12, 13 and 14 respectively are the major or locking rings 18, 19, 20, and 21. The openings of said rings 18 to 21 inclusive are provided with notches 22 to 25 inclusive, and any one of each of which that is of each ring 18 to 21, may receive the lug 17 of its respective inner ring. The outer circumference or marginal edge of each locking ring 18 to 21 is provided with a series of numerals from zero to 9 inclusive as shown at 26, and between or alternating with said numerals are notches 27. The numerals of the outer circumference of each ring 18 to 21 are opposite the notches of the openings of said ring, while the notches 27 of the outer surfaces of the rings 18 to 21 inclusive are located between the notches of said openings of said locking rings. To hold the rings 11 to 14 and the rings 18 to 21 concentric with each other and on the shank of the bolt and close together as shown in Figs. 2 and 3 a disk 28 is fitted upon the shank, there being transverse screws 31 passing through the disk 28, and engaging diametrically opposite recesses or notches 30 of the shank of said bolt, as shown clearly in Figs. 3 and 6. The shank 6 of the bolt is provided with an elongated slot or opening 32, and one end portion of the slot 32 for half its length is provided with an overhanging wall 33. Pivotally mounted upon a pin 34 and in the slot 32 is a latch or locking member 35. A leaf spring 36 is secured by screws or the like 37 to the wall 33 and has its free end engaging an edge of a tilting member 57. The end 38 of said latch or locking member 35 is provided with a bifurcation 55 and forks 56, and a tilting member 57 is provided. This tilting member 57 is pivotally mounted upon a pin 58, which extends transversely of the elongated slot or opening 32 of the shank 6 of the bolt. This tilting member 57 is provided with a chambered out portion 61, transversely of which a pin 60 extends. This pin enters the bifurcation 55 and is engaged by the forks 56 of the end 38 of the lock or latching member 35. The tilting member 57 is provided with an arm 62, the nose of which engages the wall 40 of the steering column, that is when one edge portion of the tilting member engages the groove or keeper 5, which will hold the steering pole or shaft 2 locked. By means of said spring 36 engaging an edge of the tilting member 57, the opposite edge portion of the tilting member is held into engagement with the keeper 5, when the lug 63 at the other end of said locking or latching member 35 engages the cutaway portion 10 of the disk 8. When the end of the arm 62 of the tilting member is in engagement with the wall 40 of the steering column, said arm also engaging the keeper or groove 5, the shank 6 of the bolt is prevented from being removed from the openings 3 and 4 of the column and the steering rod or pole 2 respectively. An alinement or registration of a combination of numerals of the rings 18 to 21 (one to be used from each ring 18 to 21) and the zero mark 42 of the disk 8 may be used for unlocking the latch. The disk 8 is provided with an X mark 43 diametrically opposite the zero mark 42. The zero mark is opposite the concentric portion of the cutaway part 10 of the opening 9, while the X mark is opposite the extreme eccentric part of the cutaway portion 10 of the opening 9. In order to render it easier to illustrate the structure of the improved lock, the combination of this improved lock is made up of a series of zeros and the disk 28 is provided with an indicator 44. When the spring 36 is holding one edge portion of the tilting member in engagement with the keeper 5, the lug or projection 53 is engaging the extreme eccentric part of the cutaway portion 10 of the opening 9 of the disk 8, as shown clearly in Fig. 2. In order to open the lock each locking ring 18 to 21 is rotated, until its zero mark alines with the indicator 44, in other words until the notches 27 on opposite sides of the zeros of the rings 18 to 21 register with said indicator 44. When the rings 18 to 21 are so rotated, the inner rings 11 to 14 are correspondingly rotated, since their respective lugs 17 are engaging certain of the notches 22 to 25 inclusive, and in this case the notches 16 of the opening of the inner rings will all aline or register. In order to accomplish this tilting action of the latch or locking member, whereby one edge portion of the tilting member 57 may be withdrawn from the keeper 5, it is necessary to impart a half revolution to the disk or member 8. When this half revolution is imparted to the disk 8, the eccentric cutaway portion 10 of the opening 9, that is, the wall of said eccentric cutaway-portion will ride against the end of the lug 63, thereby tilting the latching or locking member 35, which will in turn tilt the tilting member 57 on its pivot 58, consequently removing one edge portion of the tilting member from the keeper or groove 5, and the end of the arm 62 from the path of the wall 40 of the column. However, the edge portion of the tilting member 57 and the end of the arm 62 are not fully out of engagement with the keeper 5 and the wall 40 of the column until the zero mark 42 of the disk 8 registers with the zero marks of the rings 18 to 21. When the latch is so tilted, removing the end of the arm 62 from the path of the part 40 of the wall of the column and the edge portion of the tilting member from the keeper 5, the edge part 46 of the latch is thrown into said notches 16 of the openings of the rings 11 to 14 inclusive, after which the shank of the bolt of the combination lock may be withdrawn from the openings 3 and 4 of the steering column, and the rod 1 and 2 respectively, then the steering rod 2 may be rocked for steering the front wheels of the automobile. It is to be noted that the combination of the lock may be changed very easily from a series of zeroes to a combination of numerals for instance such as 1, 8, 6, 9, and zero of the rings 21, 20, 19, 18, and the disk 8 respectively, by removing the screws 31 and taking the lock apart and adjusting the inner rings 11 to 14 accordingly so that projections 17 will engage other notches of the openings of the rings 18 to 21, and reassemble the lock.

The invention having been set forth what is claimed as new and useful is:—

1. In a combination lock for steering columns, a tubular stationary column having an opening in its wall, a rocking steering rod mounted therein and provided with an opening adapted to register with the first opening, the second opening having an elongated groove, a combination lock having a slotted bolt fitting said registered openings, a latch pivoted in the slot of the bolt, and a tilting member pivoted in the slot of said bolt and having an arm and adapted to engage said groove, whereby the end of the arm may engage behind the wall of the steering column, and means connecting the latch and the tilting member, whereby the tilting member may be disengaged from the groove when the latch is tilted.

2. In a combination lock for steering columns, a tubular stationary column having an opening in its wall, a rocking steering rod mounted therein and provided with an opening adapted to register with the first opening, the second opening having an elongated groove, a combination lock having a slotted bolt fitting said registered openings, a tilting member pivoted in the slot of said bolt and having an arm to engage said groove, whereby the end of the arm may engage behind the wall of the steering column, and means mounted in said bolt for tilting said tilting member to withdraw the arm from the groove.

3. In a combination lock for steering columns, a tubular stationary column having an opening in its wall, a rocking steering rod mounted therein and provided with an opening adapted to register with the first opening, the second opening having an elongated groove, a combination lock having a slotted bolt fitting said registered openings, a tilting member pivoted in the slot of said bolt and having an arm to engage said groove, whereby the end of the arm may engage behind the wall of the steering column, a latch pivotally mounted in said bolt and having one end loosely connected to the tilting member to withdraw the arm from the groove.

4. In a combination lock for steering columns, a tubular stationary column having an opening in its wall, a rocking steering rod mounted therein and provided with an opening adapted to register with the first opening, the second opening having an elongated groove, a combination lock having a slotted bolt fitting said registered openings, a tilting member pivoted in the slot of said bolt and having an arm to engage said groove, whereby the end of the arm may engage behind the wall of the steering column, a latch pivotally mounted in said bolt and having one end loosely connected to the tilting member to withdraw the arm from the groove, and means whereby said latch may be locked and unlocked.

5. In a combination lock for steering columns, a stationary tubular member having an opening in its wall, a rocking rod fitting said tubular member having an opening to register with the first opening, the second opening having an elongated groove, a slotted bolt fitting said registered openings, a latch pivotally mounted in the slot of the bolt, spring tensioned means in the slot of said bolt and connected to the latch and adapted to enter the groove behind the wall of the tubular member adjacent the first opening, a plurality of rings surrounding the bolt for locking the latch, the walls of said openings of the rings having notches to be alined to receive one edge of the latch at its end portion opposite said means, the end of the latch opposite said spring tensioned means having a lug, and a disk ring on said bolt provided with an eccentric cutaway portion adjoining its opening adapted to cam against the lug of the latch and tilt the latch member, whereby said edge may enter the alined notches and consequently withdraw said means from said groove.

6. In a combination lock for steering columns, a stationary tubular member having an opening in its wall, a rocking rod fitting said tubular member having an opening to register with the first opening, the second opening having an elongate groove, a slotted bolt fitting said registered openings, a latch pivotally mounted in the slot of the bolt, spring tensioned means in the slot of the bolt and connected to the latch and adapted to enter the groove behind the wall of the tubular member adjacent the first opening, a plurality of rings surrounding the bolt for locking the latch, the walls of said openings of the rings having notches to be alined to receive one edge of the latch at its end portion opposite said means, the end of the latch opposite said spring tensioned means having a lug, and a disk ring on said bolt provided with an eccentric cutaway portion adjoining its opening adapted to cam against the lug of the latch and tilt the latch member, whereby said edge may enter the alined notches and consequently withdraw said means from said groove, and a plurality of ring members surrounding the first ring members respectively, whereby the first ring members may be individually rotated for alining their notches.

7. In a combination lock for steering columns, a stationary tubular element having an opening in its wall, a rocking rod in said tubular element and provided with an opening registerable with the first opening, the second opening having a keeper, a slotted bolt fitting said registered openings, a latch member pivotally mounted in the slot of the bolt, means connected to one end of said latch to enter said keeper behind the wall of the element adjacent the first opening, holding means on the bolt for said latch, said holding means having means to be registered to receive one edge of said other end of the latch, said other end of the latch having a lug, a rotatable element on said bolt and provided with an eccentric cutaway part adapted to cam against said lug when the element is rotated to move said edge into said registered receiving means, and means for operating the holding means, whereby said receiving means may be registered.

In testimony whereof I have signed my name to this specification in the presence of two subscribing witnesses.

ARTHUR DREW.

Witnesses:
H. WINCHESTER,
L. B. SWEET.